(12) United States Patent
V'yalitsin et al.

(10) Patent No.: US 11,476,009 B2
(45) Date of Patent: Oct. 18, 2022

(54) NUCLEAR REACTOR FUEL ASSEMBLY

(71) Applicant: JOINT STOCK COMPANY EXPERIMENTAL AND DESIGN ORGANIZATION "GIDROPRESS" AWARDED THE ORDER OF THE RED, Moskovskaya obl. (RU)

(72) Inventors: Viktor Vasil'evich V'yalitsin, Podolsk (RU); Sergey Aleksandrovich Kushmanov, Podolsk (RU); Dmitriy Nikolaevich Puzanov, Podolsk (RU); Dmitriy Viktorovich V'yalitsin, Podolsk (RU)

(73) Assignee: JOINT STOCK COMPANY "EXPERIMENTAL AND DESIGN ORGANIZATION GIDROPRESS" AWARDED THE ORDER OF THE RED, Moskovskaya obl. (RU)

( * ) Notice: Subject to any disclaimer, the term of this patent is extended or adjusted under 35 U.S.C. 154(b) by 0 days.

(21) Appl. No.: 17/256,554

(22) PCT Filed: Dec. 29, 2018

(86) PCT No.: PCT/RU2018/000912
§ 371 (c)(1),
(2) Date: Dec. 28, 2020

(87) PCT Pub. No.: WO2020/040657
PCT Pub. Date: Feb. 27, 2020

(65) Prior Publication Data
US 2021/0366623 A1 Nov. 25, 2021

(30) Foreign Application Priority Data

Aug. 23, 2018 (RU) .......................... RU2018130533

(51) Int. Cl.
*G21C 3/33* (2006.01)
*G21C 3/326* (2006.01)
(Continued)

(52) U.S. Cl.
CPC .......... *G21C 3/3315* (2013.01); *G21C 3/326* (2013.01); *G21C 3/331* (2013.01); *G21C 7/20* (2013.01); *G21C 3/04* (2013.01); *G21C 3/3305* (2013.01)

(58) Field of Classification Search
CPC ........ G21C 3/3315; G21C 3/331; G21C 7/20; G21C 3/32; G21C 3/04
(Continued)

(56) References Cited

FOREIGN PATENT DOCUMENTS

WO    WO-2019240610 A1 * 12/2019

OTHER PUBLICATIONS

Japanese Patent Office, Application 2020-565917, "Notice of Reasons for Refusal", dated Dec. 2021. (Year: 2021).*

* cited by examiner

*Primary Examiner* — Jack W Keith
*Assistant Examiner* — Daniel Wasil
(74) *Attorney, Agent, or Firm* — J. Miguel Hernandez; James R. Gourley; Carstens & Cahoon, LLP

(57) ABSTRACT

Nuclear reactor fuel assembly comprising fuel elements installed in a frame having guide channels and spacer grids; a bottom nozzle; and a removable head. The head comprising collet tubes, an upper shell, a support element in the form of a tube, and springs. The collet tubes comprise two coaxially arranged tubes that are movable relative to each other and that each have stops on their side surfaces. The stops interact with each other to select the length of the collet tubes. The upper shell has a tube with a rigidly fixed plate interacting with the springs. The plate has plural holes
(Continued)

having a shape corresponding to a shape of a respective boss of the support element. The clearance in plan view between a respective hole and a respective boss being at least the mounting clearance between the tube of the support element and the tube of the upper shell.

1 Claim, 5 Drawing Sheets

(51) Int. Cl.
  *G21C 7/20* (2006.01)
  *G21C 3/04* (2006.01)
(58) Field of Classification Search
  USPC .................................................. 376/225, 364
  See application file for complete search history.

NUCLEAR REACTOR FUEL ASSEMBLY

CROSS-REFERENCE TO RELATED DISCLOSURE

This application is a U.S. National Stage of International Application No. PCT/RU2018/000912, filed on Dec. 29, 2018, and published as WO 2020/040657 on Feb. 27, 2020, titled "Nuclear Reactor Fuel Assembly," which claims priority to RU 2018130533 filed on Aug. 23, 2018. Each application, publication, and patent listed in this paragraph are hereby incorporated by reference in their entireties.

TECHNICAL FIELD OF THE INVENTION

The invention relates to nuclear engineering, more particularly, to fuel assemblies of nuclear pressurized water reactors.

PRIOR ART

A nuclear reactor fuel assembly is known (a prototype, V. D. Shmelev, Yu. G. Dragunov et al., Cores of VVER for Nuclear Power Plants, Moscow, IKC Akademkniga, 2004, pp. 130-131, FIGS. 6.18 and 6.19), which comprises a bundle of fuel rods, installed in a frame formed by guide channels and spacing grids, a bottom nozzle, and a removable head. The removable head comprises the upper and lower shells, support hold-down plate, springs, collet tubes. The lower ends of the collet tubes are fixed to the guide channels, and the upper ones pass through holes in the hold-down plate and the upper shell's plate and have thrust bushings at the end. Thus, when the head is in operation, there may be a control rod in its upper shell.

The drawback of the known fuel assembly is that when a control rod falls, the support plate moves along 18 collet tubes which are fixed to the guide channels on one side and in the holes of the upper shell's plate on the other one. To avoid jamming, it is necessary that the holes are accurately positioned for the passage of collet tubes in the support plate and the upper shell's plate. Also, this technical solution does not allow to reduce the height of the head in order to increase the fuel load without changing the dimensions of the fuel assembly. Another drawback of the known fuel assembly is that when the head which is fixed by collets on the guide channels is compressed, the collet tubes go up relative to the upper shell's plate. This requires choosing the height of the upper shell so that the collet does not interact with the elements of the control rod, which is a drawback, since it increases the height of the head, which negatively affects the uranium capacity of the fuel assembly.

DISCLOSURE OF THE INVENTION

The objective of the invention is to develop a design of a fuel assembly with the increased uranium capacity while maintaining end-to-end dimensions.

The object of the invention is to reduce the axial dimensions of the head of the fuel assembly, which allows increasing the height of the fuel column.

The technical result of the invention is a change in the design of the removable head enabling tightening of the fuel assembly, falling control rod energy dissipation with reduced axial dimensions of the removable head.

The invention's objective is achieved by the fact that the fuel assembly of a nuclear reactor comprises a bundle of fuel rods (1) installed in a frame formed by guiding channels (2) and spacing grids (3), a bottom nozzle (4), a removable head (5) comprising an upper shell (6), a support element (7), springs (8), and collet tubes 17. The innovation lies in that the upper shell (6) of the removable head (5) is made in the form of a tube (9) with a rigidly fixed plate (10) interacting with the springs (8), with the collets (17) made of coaxially located lower tubes (18) and upper tubes (19) fixed in the plate (10), the inner surface of the upper tubes (19) and the outer surface of the lower tubes (18) have base platforms (20) that interact with each other, the support element (7) is made in the form of a tube (11) coaxially located to the pipe (9) of the upper shell (6) with the necessary assembly clearance (12) and having a boss (13) in its lower part interacting with the springs (8), and a stop (14) in its upper part interacting with the tube (9) of the upper shell (6); the plate (10) of the upper shell (6), opposite each boss (13) of the support element (7), has holes (15) whose shape corresponds to the shape of the boss (13) of the support element (7), with the clearance in plan view between the hole (15) in the plate (10) of the upper shell (6) and the boss (13) being at least the mounting clearance (12) between the tube (11) of the support element (7) and the tube (9) of the upper shell (6).

BRIEF DESCRIPTION OF DRAWINGS

The essence of the invention is explained by drawings, which are presented on.

EMBODIMENT OF THE INVENTION

Figure 1:
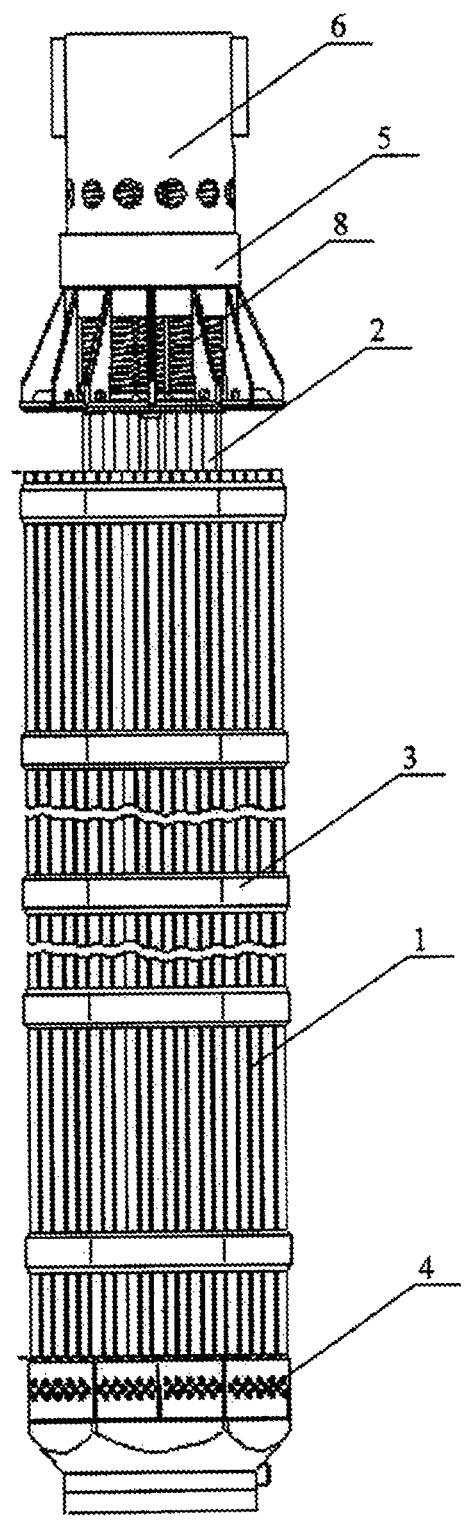
FIG. 1—nuclear reactor's fuel assembly.
Figure 2:
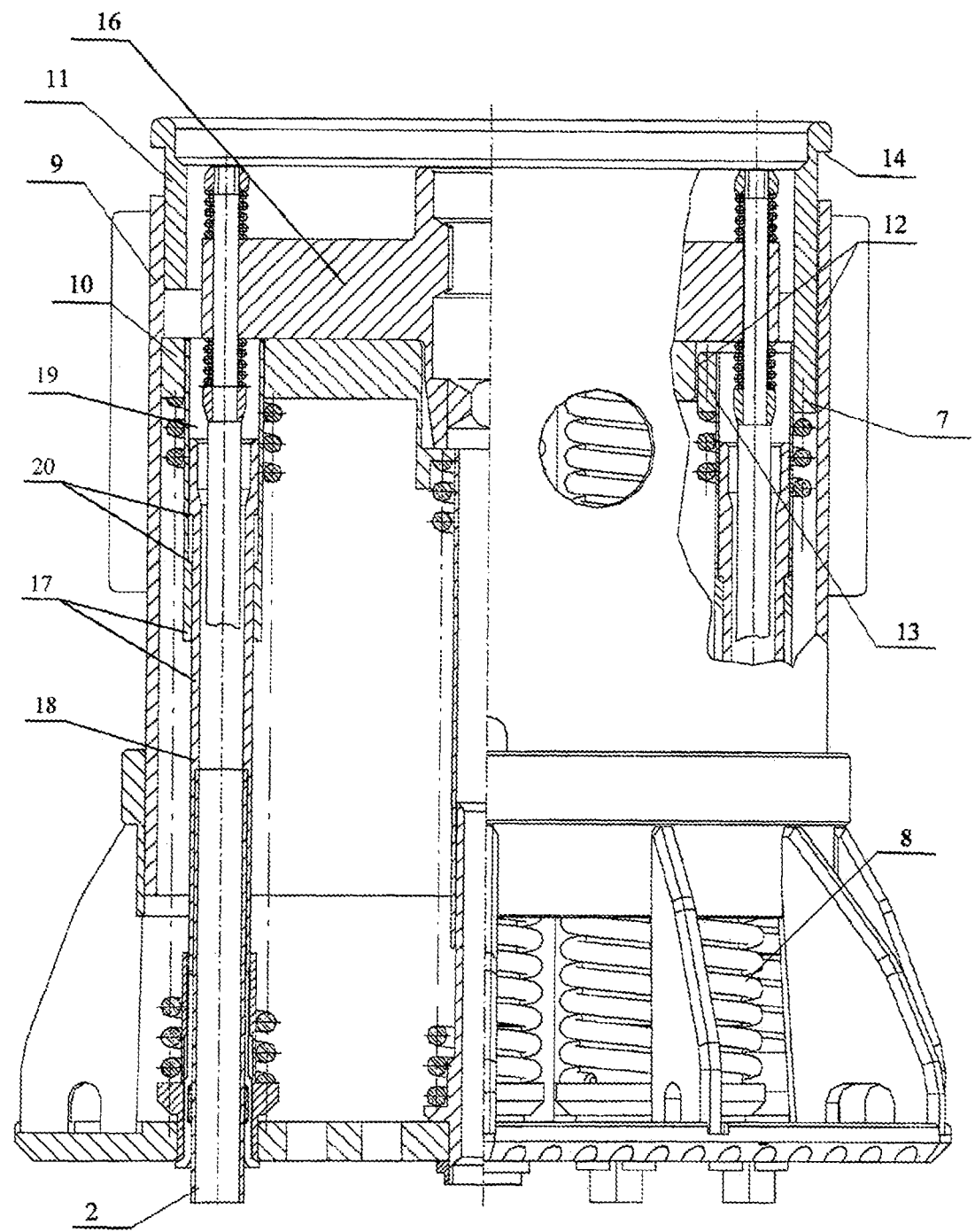
FIG. 2—vertical section of the removable head of a nuclear reactor's fuel assembly showing the position of the head's elements when the control rod is deformed.
Figure 3:
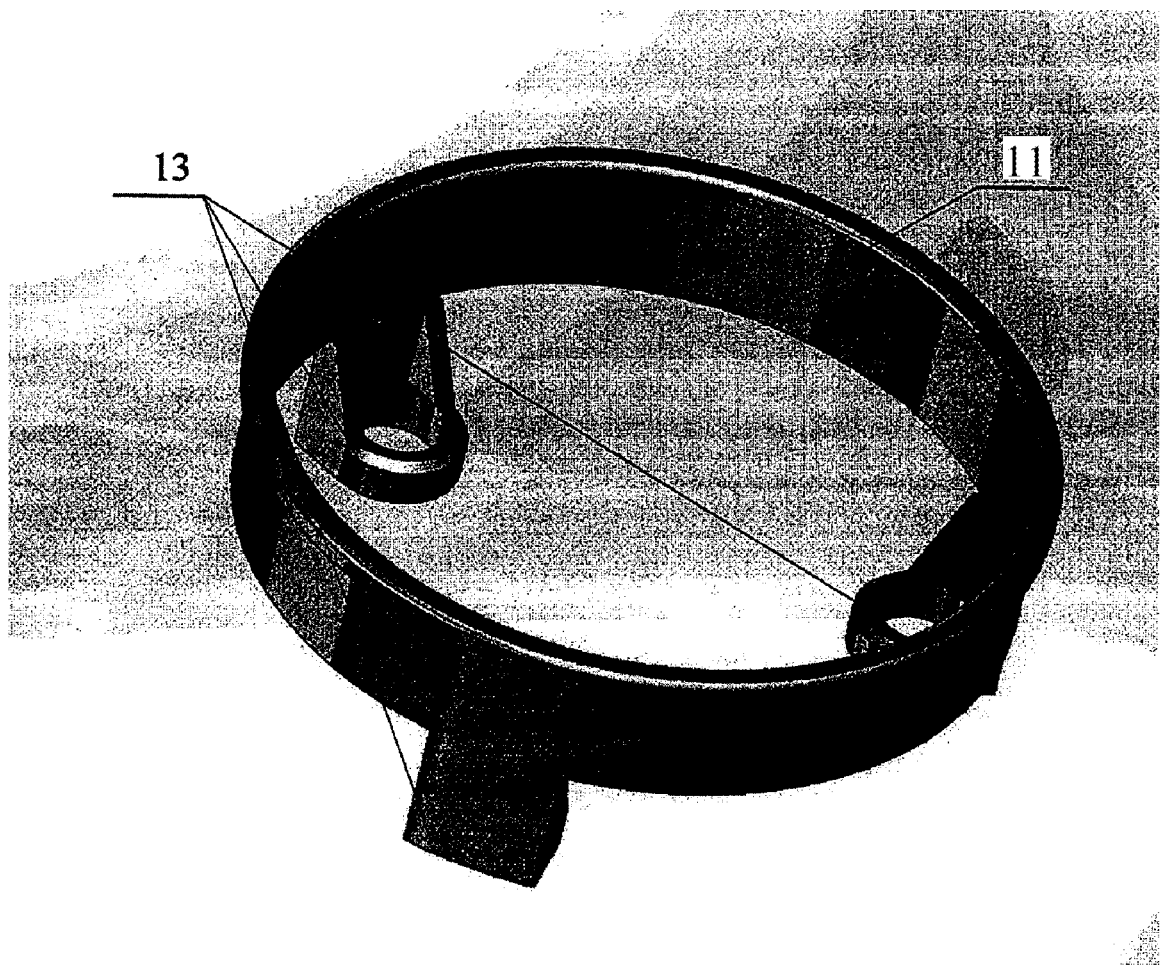
FIG. 3—support element with the bosses.
Figure 4:
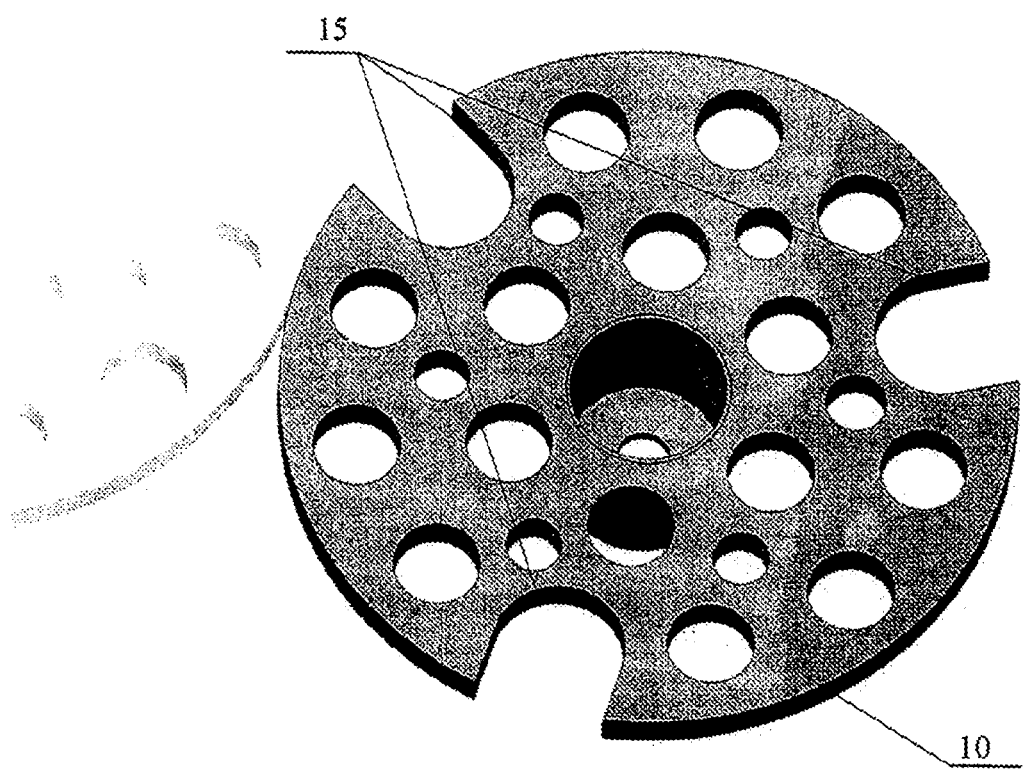
FIG. 4—upper shell's plate.
Figure 5:
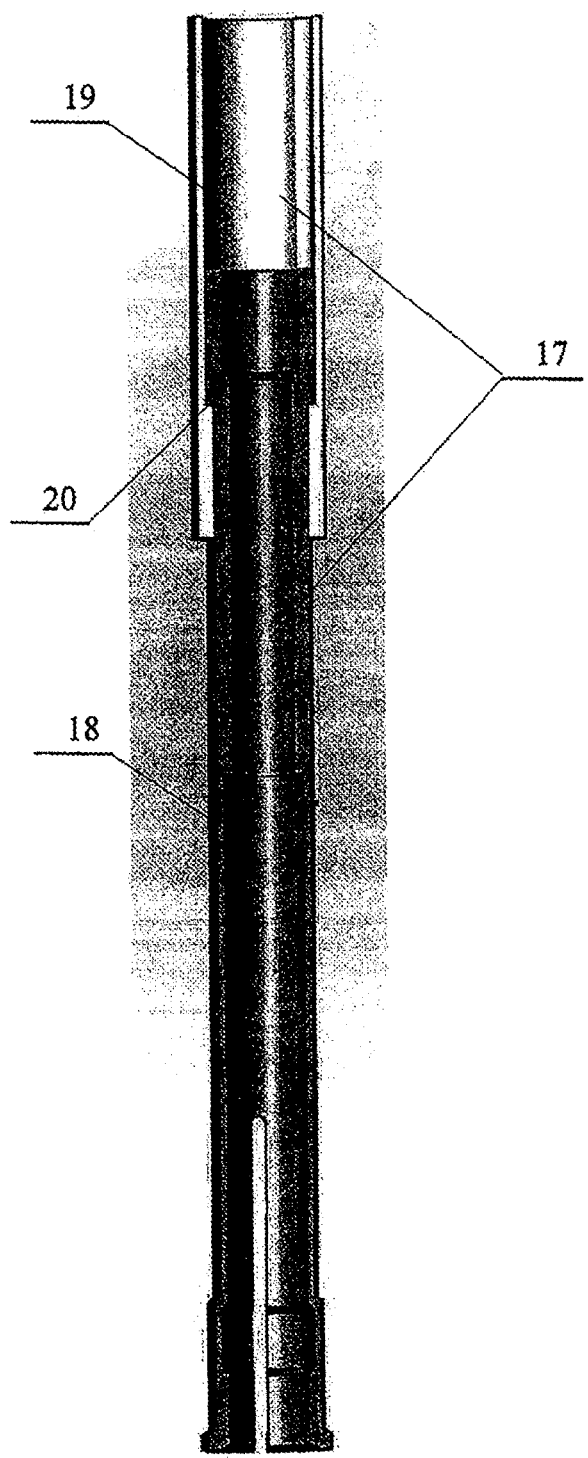
FIG. 5—section of a collet tube made of the upper tube and the lower tube.

The fuel assembly of a nuclear reactor comprises a bundle of fuel rods (1) installed in a frame formed by guiding channels (2) and spacing grids (3), a bottom nozzle (4), a removable head (5) comprising an upper shell (6), a support element (7), springs (8), and collet tubes (17). The collet element (17) is made of coaxially located lower tube (18) and upper tube (19) rigidly fixed in the plate (16), the upper shell (6), while on the inner surface of the tube (19) and on the outer surface of the lower tube (18) there are base platforms (20) which interact with each other. The upper shell (6) of the removable head (5) is made in the form of a tube (9) with fixed plate (10) interacting with springs (8), support element (7) made in the form of a tube (11) located coaxially to the tube (9) of the upper shell (6) with a required installing clearance (12) and having bosses (13) in the lower part interacting with springs (8), and at the upper part the stop (14) interacting with the tube (9) of the upper shell (6), and in the plate (10) of the upper shell (6) opposite each of the bosses (13) of the support element (7) there are holes (15) which conform to the shape of the boss (13) of the support element (7), wherein the clearance in plan view between the hole (15) in the plate (10) of the upper shell (6) and the boss (13) is at least the installing clearance (12) between the tube (11) of the support element (7) and the tube (9) of the upper shell (6).

The operation of the nuclear reactor fuel assembly is carried out as follows.

Collet elements (17) are split-type, consisting of an upper (19) and a lower (18) tube with support platforms (20) on the inner surface of the tube (19) and the outer surface of the lower tube (18). Thus, the upper tube (19) of the collet element (17) is rigidly connected (for example, by welding) to the plate (10) of the upper shell (6) of the head.

Springs with initial pre-tightening are installed coaxially to the collet elements (17) and create a force on the upper (19) and lower (18) tubes of the collet element (17). Due to this force when the head is not tightened the upper (19) and lower (18) tubes of the collet element (17) are pressed against each other by the base platforms (20) made in them. The relative location of these base platforms (20) and the sizes of the upper (19) and lower (18) tubes taking into account a rigid connection of the upper tube (19) with the plate (16) and the upper shell (6) of the head determines the maximum distance between the plates of the upper and lower shells and therefore, the overall vertical dimension of the unloaded head of the fuel assembly (not shown in the drawing) and a pre-tightening of the head's spring unit.

Portion of springs (8) of the removable head (5) of a nuclear reactor's fuel assembly thrusts their upper ends against the plate (10) of the upper shell (6) rigidly connected to the upper shell (6). The other portion of the springs (8) thrusts its upper ends against the bosses (13) of the support element (7).

The fuel assembly with the removable head (5) installed in a nuclear reactor is pre-tightened by the internals of the nuclear reactor (not shown in the figure). When tightening the head of the fuel assembly, the upper shell (6) of the head moves down together with the support element (7), the tube (9) with the plate (10) rigidly fixed in it, and the upper tubes (19) of collet elements connected to the plate (10), which move along the lower collet tubes (18), wherein a clearance is formed between the stop (20) of the upper tube (19) and the stop (20) of the lower collet tube (18). The springs rest against the plate (10) or against the bosses (13) of the support element (7) with their upper end, and against the lower projections of the lower tubes (18) of the collet elements (17) with their lower end through special bushings. Each guide channel (2) goes inside the corresponding lower tube (18) of the collet element (17). Tightening the head of the fuel assembly causes reduction of the distance between the plate (10) and the upper ends of the guide channels which support the lower collet tubes (18) and, consequently, there are additional (beyond preliminary one) compression of the springs of the spring unit and higher tightening forces of individual guide channels. When tightening the head (5) of fuel assembly, the support element (7) together with the tube (9) and the plate (10) moves down compressing all the springs (8) of the spring unit of the fuel assembly. The force generated by the springs (8) ensures that the fuel assembly does not float in all the operating modes.

When the emergency protection actuates, the structural elements (16) of the control rod interact with the plate (10). The control rod falling energy is absorbed by springs interacting directly with the plate (10) of the upper shell (6). The tube (9), plate (10) and the upper tubes (19) of the collet element (17) are moved; the springs are compressed adding to the load through the lower collet tubes (18) and the guide channels (2) in the same way as when the fuel assembly is tightened. When the emergency protection actuates, the structural elements (16) of the control rod interact with the plate (10) rigidly fixed in the tube (9) of the upper shell (6) pressing it down. The control rod falling energy is absorbed by springs (8) interacting directly with the plate (10) of the upper shell (6). Wherein the springs (8) resting on the bosses (13) of the support element (7) remain stationary due to the cutouts in the plate (10) of the upper shell (6) into which the bosses (13) of the support element (7) enter. Thus, this ensures that a nuclear reactor's fuel assembly is fixed in the plate of the reactor's protective tube unit when the emergency protection is triggered.

INDUSTRIAL APPLICABILITY

The proposed solution is most appropriate to be used for operation in water cooled water moderated power reactors. For mounting and dismounting the removable head, a device can be used in accordance with RF patent No. 2075118.

The proposed improvement in the design of the removable head of the fuel Assembly makes it possible to reduce its dimensions while maintaining the fixation of the fuel Assembly in the reactor's internals at the time of damping the decreasing regulator.

What is claimed is:
1. A nuclear reactor fuel assembly comprising:
   a bundle of fuel rods installed in a frame formed by guide channels and spacer grids;
   a bottom nozzle; and
   a removable head comprising:
      an upper shell;
      a support element;
      springs; and
      collet elements;
wherein:
   the upper shell of the removable head is made in the form of a tube with a rigidly fixed plate interacting with the springs;
   the collet elements are made of coaxially located lower tubes and upper tubes fixed in the plate;
   the collet elements comprise support platforms that interacting with each other and are respectively located on the inner surface of the upper tubes and the outer surface of the lower tubes;
   the support element is made in the form of a tube coaxially located with respect to the tube of the upper shell with a mounting clearance and having bosses in a lower part of the support element interacting with the springs, and a stop in an upper part of the support element interacting with the tube of the upper shell;
   the plate of the upper shell, opposite each boss of the support element, has a hole, thereby providing a plurality of holes, each hole in the plurality of holes having a shape corresponding to a shape of a respective boss of the support element, with the clearance in plan view between the respective hole in the plate of the upper shell and the respective boss being at least the mounting clearance between the tube of the support element and the tube of the upper shell.

* * * * *